(No Model.) 2 Sheets—Sheet 2.

C. WRIGHT.
POTATO PLANTER.

No. 481,456. Patented Aug. 23, 1892.

Witnesses_ Inventor_
Geo. E. Fuch. Chester Wright
R. H. Fitzgerald per Lehmann Pattison & Nesbit
atty's.

UNITED STATES PATENT OFFICE.

CHESTER WRIGHT, OF FAIRFIELD, NEBRASKA.

POTATO-PLANTER.

SPECIFICATION forming part of Letters Patent No. 481,456, dated August 23, 1892.

Application filed January 5, 1892. Serial No. 417,098. (No model.)

*To all whom it may concern:*

Be it known that I, CHESTER WRIGHT, of Fairfield, in the county of Clay and State of Nebraska, have invented certain new and useful Improvements in Potato-Planters; and I do hereby declare the following to be a full, clear, and exact description of the invention, such as will enable others skilled in the art to which it pertains to make and use it, reference being had to the accompanying drawings, which form part of this specification.

My invention relates to improvements in potato-planters; and it consists in the construction and combination of parts, which will be fully described hereinafter, and particulatly referred to in the claims.

The object of my invention is to produce a potato-planter of the construction hereinafter described, whereby the potatoes are taken from a hopper by pickers of the construction specified and automatically dropped into an opening or furrow, and to provide an adjustable opener and an adjustable coverer.

Figure 1:
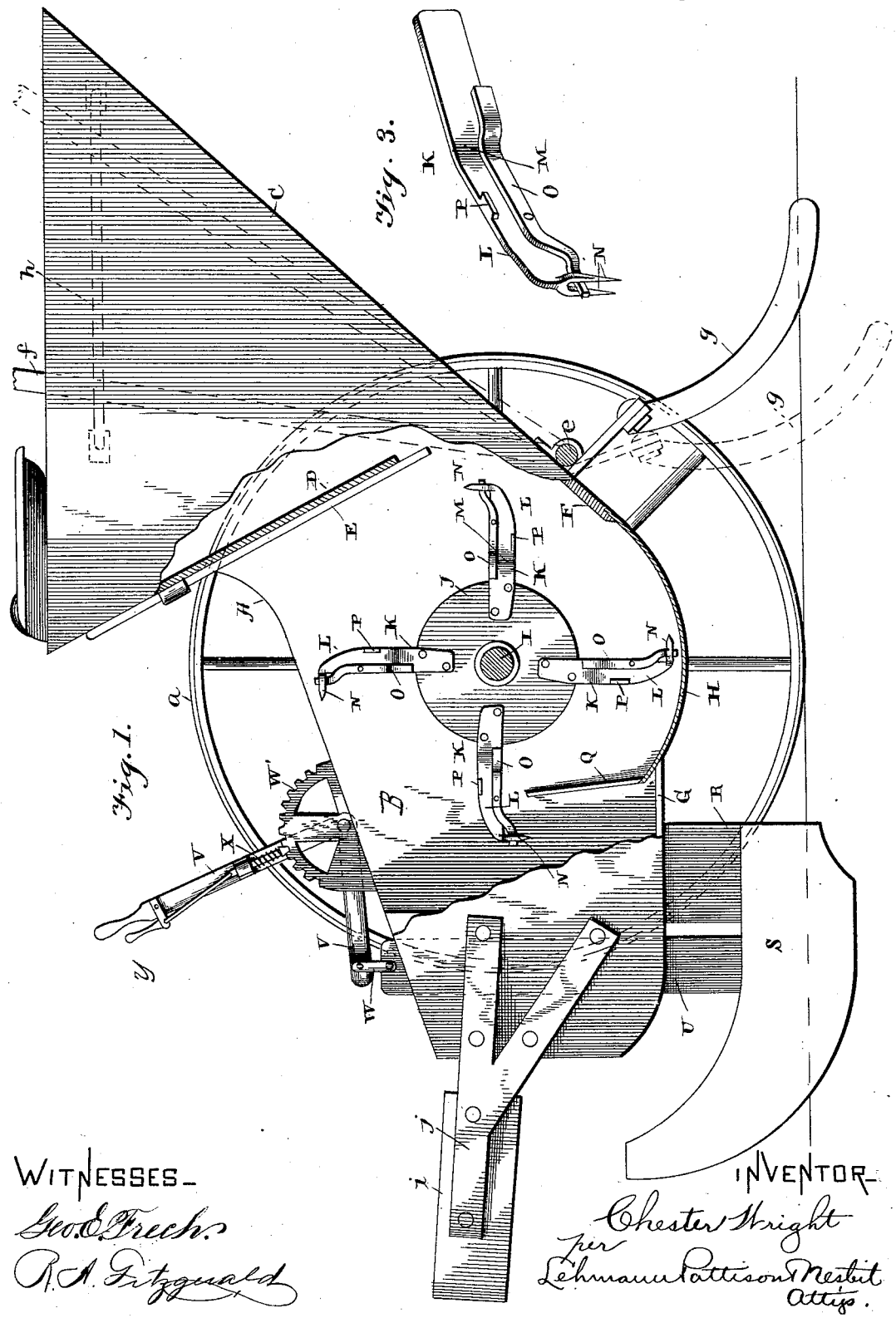
Figure 2:
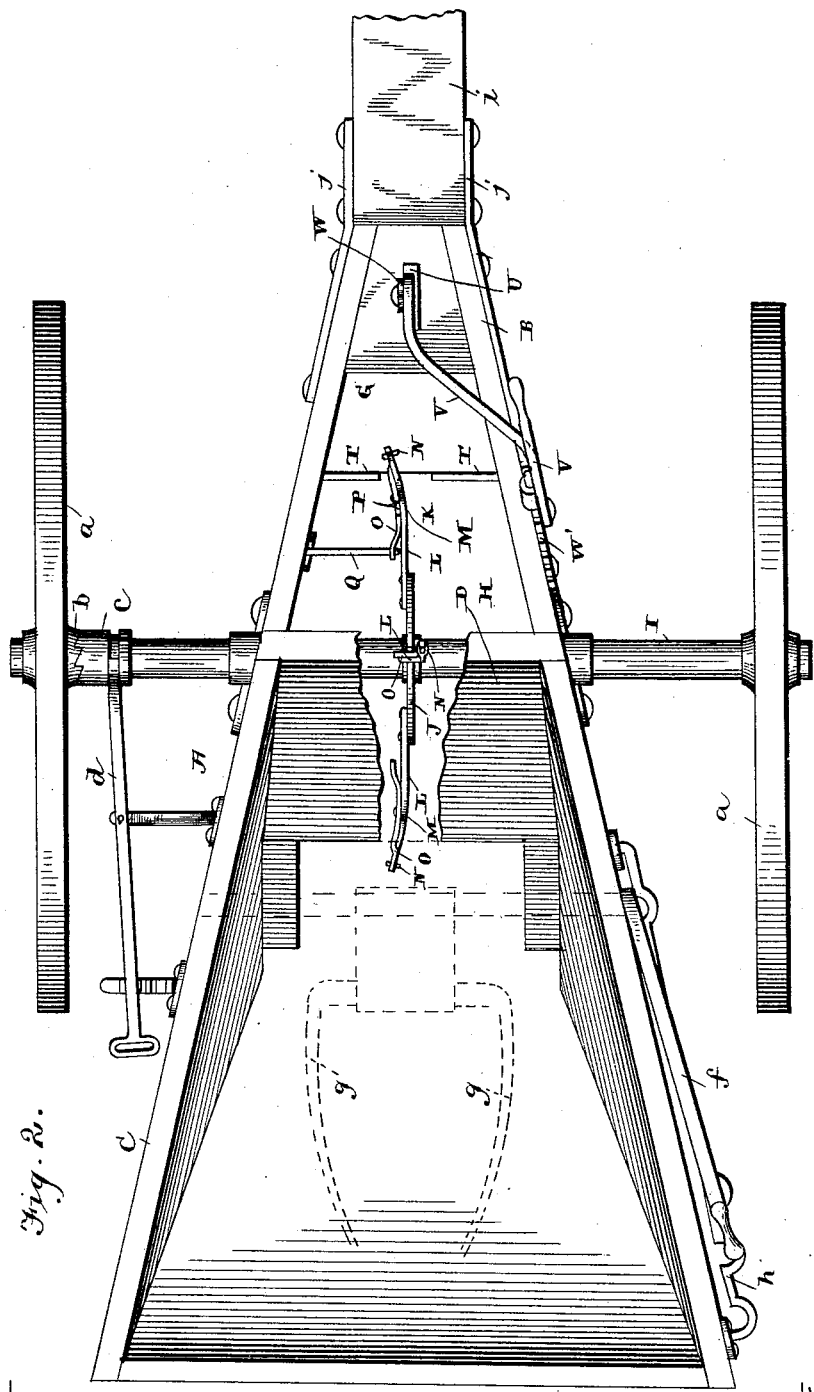

In the drawings, Figure 1 is a side elevation of a planter embodying my invention, the supporting and driving wheel upon the exhibited side being removed and the interior portions being shown by breaking away the hopper. Fig. 2 is a plan view of the same. Fig. 3 is a detached perspective view of one of the automatic pickers.

A indicates the frame of the machine, which is made V-shaped in horizontal section, as shown in Fig. 2, which frame forms the hopper to receive the potatoes. This frame is made substantially L-shaped—that is, with a lower horizontal portion B and a rear vertical portion C. The upright portion c forms the hopper proper, which is constructed with the inclined side D projecting toward the opposite inclined side of the hopper. The former, however, does not extend to the latter, and thus a space is left for the passage of potatoes from the hopper to the planting-wheel. Sliding upon this inclined partition or side D is a slide E, by means of which the feed of the potatoes to the lower portion of the frame A is regulated, as will be understood. The rear lower end of the hopper is formed of a board F and the extreme front portion of a board G, and these two boards are connected by a curved plate H, which forms a portion of a circle, with the shaft I as the center thereof. This shaft I passes horizontally through the horizontal portion of the frame A a suitable distance from the bottom and carries a disk J, secured centrally thereon. Secured to this disk J at proper intervals and extending outward therefrom parallel with its plane are a series of pickers K, which are automatic in their action. These pickers consist of plates L, which are secured to the disk by means of bolts or other suitable securing means and are bent at the point M alternately in opposite directions, so that each succeeding picker will travel out of the path of the other by about an inch. The other ends of these plates L are provided with laterally-extending points or forks N, between which the outer ends of stripper-levers O extend. These stripper-levers O are pivoted to the plates L and are limited in their movement in one direction by means of a stop P, which extends laterally from one end of the plate.

Extending outward from one side of the frame A at a proper point to be struck by the inner ends of the stripper-levers are the bars or tripping projections Q. These trippers are so situated in relation to the circular path traveled by the pickers that they have their inner ends engaged by the inner ends of the strippers O, thus throwing their outer ends in the opposite direction and removing the potato caught by the prongs or teeth of the picker. This operation is caused just as the pickers are over the spout or conveyer R, which leads to the rear end of the opener S, which has its rear ends separated to allow the potatoes to fall between them in the furrow formed thereby.

The curved plate H has its inner or front end extending up into the horizontal portion of the frame, as shown, and has secured thereto two vertical boards T, which extend inward from opposite sides of the frame and have their inner ends separated sufficiently to allow the pickers to pass between them. These boards form a front end to the lower portion of the frame and prevent the potatoes from rolling out into the spout R and into the furrow.

Secured between the extreme front ends of the sides of the frame A is a block, through which passes a vertical standard U, which has its lower end secured to the opener. The upper end of this standard is connected to the lower and forward end of an L-shaped lever V by means of a link W. This L-shaped lever V is pivoted to a quadrant W', that is secured to one side of the frame A at its upper edge.

Placed upon the L-shaped lever is a catch X, which is operated by a pivoted lever Y upon the L-shaped lever, and this catch engages the segments of the quadrant and is locked in any desired adjustment. The forward and lower end of this lever V is bent inward to enable it to be connected to the upper end of the standard. By means of this construction the opener can be made to run deep or shallow by an adjustment of the said lever V, as will be understood, and locked in the desired adjustment.

Placed loosely upon the ends of the shaft or axle I are the supporting and driving wheels a, one of which is provided with a ratchet upon the inner end of its hub, as shown at b, which engages a sliding collar c upon the shaft and which is feathered thereto to revolve therewith in the usual manner. The outer edge of this collar is provided with ratchet-teeth which engage the ratchet-teeth of the hub, as shown, so that when the collar is moved outward by means of a lever d, which is supported upon the outer side of the frame A, it is made to engage the said hub, and thus lock the wheel to the shaft, so that the shaft is revolved thereby. In this manner, as will be understood, the shaft is thrown in and out of gear and the operation of the machine started and stopped at will.

Journaled or pivoted to the rear side of the hopper near its lower end is a shaft e, which has connected to one end thereof an operating-lever f. Connected to this shaft and extending rearward and curved inward are suitable coverers g, which can be raised and lowered by the said lever. This lever has its upper end engaging a plate h, which has its ends secured to the side of the frame and supported a suitable distance therefrom, the inner side of the plate or rod being provided with notches to catch and hold the said lever. By means of this arrangement the coverers are raised and lowered, as desired, for any purpose, either to raise them entirely from the ground or to cause them to run deep or shallow.

A tongue i is secured to the forward end of the frame A by means of plates j and bolts, as shown.

The inner ends of the strippers are bent outward a suitable distance from the plates to which they are pivoted, so that they are readily struck and operated by the trippers which extend inward from the inner side of the frame, as before described.

Having thus described my invention, I claim—

1. In a potato-planter, a hopper, a shaft extending through it, a disk upon the shaft, picker-plates secured to and extending from the disk, having their outer portions alternately turned to one side, teeth at the outer ends of said plates, stripping-levers pivoted between their ends upon the plates, the outer ends of the levers projecting between the teeth, and trippers in the hopper which engage the inner ends of the stripping-levers, the parts being combined substantially as shown and described.

2. An automatic picker for a planter of the character described, comprising a plate having its outer end provided with laterally-extending prongs, a stripping-lever pivoted near one edge of the plate, which has its outer end between the said prongs, a tripper, and a stop at the opposite side of the plate, which engages the inner end of the said lever, substantially as described.

3. In a planter, a frame, a supporting-shaft, an opener at the front end of the frame, a shaft journaled at the rear end of the frame carrying coverers, a lever for operating the shaft for raising or lowering the coverers, and a means connected with the shaft for feeding potatoes, substantially as set forth.

In testimony whereof I affix my signature in presence of two witnesses.

CHESTER WRIGHT.

Witnesses:
   J. E. HOPPER,
   D. A. ATWELL.